UNITED STATES PATENT OFFICE.

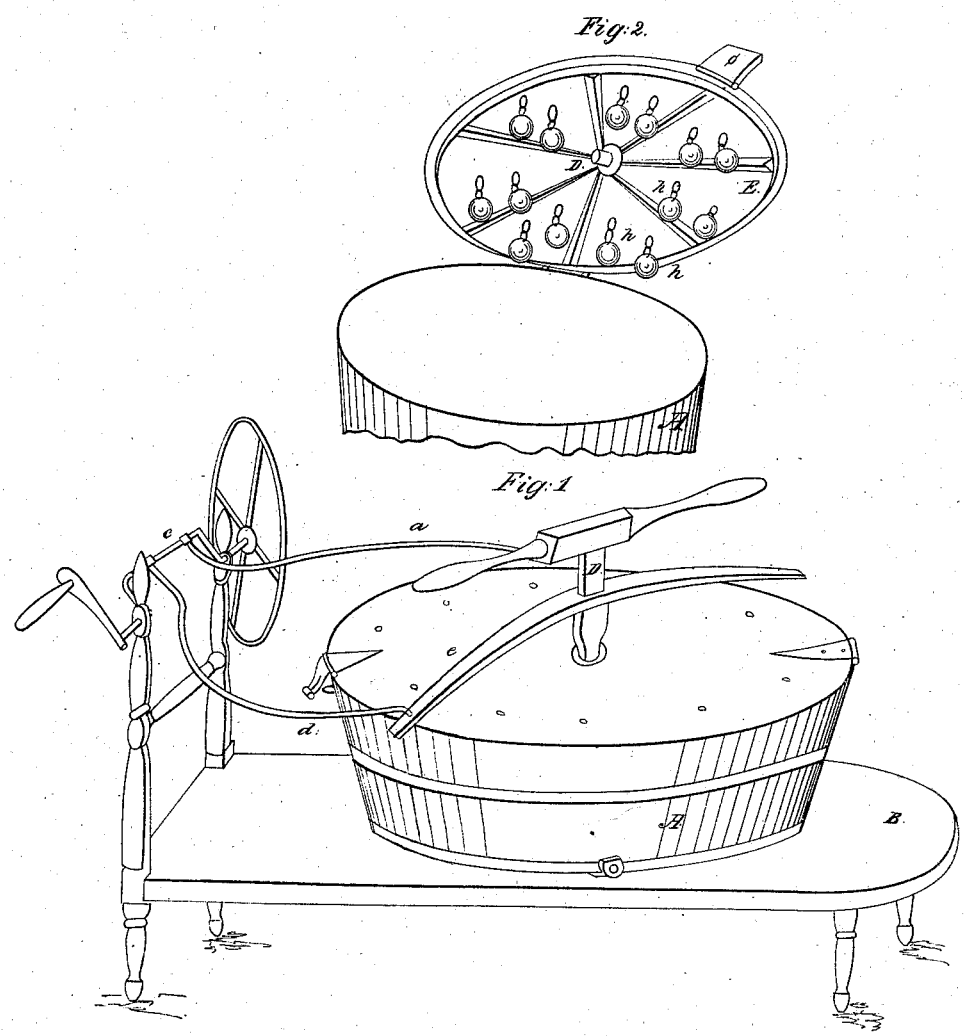

ZIBA CASTERLINE, OF LIBERTY, INDIANA.

WASHING-MACHINE.

Specification of Letters Patent No. 22,780, dated February 1, 1859.

*To all whom it may concern:*

Be it known that I, ZIBA CASTERLINE, of the town of Liberty, in the county of Union and State of Indiana, have invented certain new and useful Improvements in Washing-Machines; and I do hereby declare that the following is a full, clear, and exact description of the same, reference being had to the accompanying drawings, making a part of this specification, of which—

Figure 1 exhibits the machine as closed, and having one of the rods from the crank shaft attached to the tub, while the other is connected with an arm of the rubber. Fig. 2 exhibits the lid of the tub as thrown open, showing the rubber (by red line) with the hung balls secured to it with chains.

In most of the washing machines as heretofore constructed there has been a want of a proper rubbing surface, and a lack of that kneading pressure requisite in cleansing the clothes. My improvement obviates both of these defects, and consists in the employment of balls (zinc I have found best) attached to the upper rubber by chains or other device, which being moved by the upper rubber effectually operate in washing while the ordinary radial ribs of the tub hold the clothes in undergoing the rubbing combined with the kneading of the aforesaid balls.

The mere employment of balls as a means of washing is not new, but their use as loose balls are inefficient, while they are attended with difficulty of removal in changing the clothes in the tub. By my improvement from the balls having only a partial liberty they not only wash better as they are moved back and forth by the rubber, but their removal from the tub is readily accomplished in the raising of the lid and rubber.

To enable others skilled in the art to construct and use my improved tub it may be described as follows:

A is an ordinary washing tub provided with radial ribs on its bottom. It is secured to a pivoted cross bar entering the bench B, so that the tub may have a partial rotation by the rod (*a*) extending from the crank shaft *c*, to a loop on the rim of the tub. (*d*) is another rod extending from the crank to a yoke (*e*) secured on the shaft D of the upper rubber E. By passing the shaft through the lid of the tub and into a step in the bottom of the tub, it is kept in place while the rubber is partially rotated in a direction contra to that given the tub, by the same crank shaft. On the upper rubber E, as seen in Fig. 2, are hung by chains the balls *h*, *h*, *h*; the rubber is furnished with radial ribs between which the balls play freely as the rubber is moved by the crank, or if desired, by hand applied to a handle above the yoke.

Having described my improvement what I claim as my invention and desire to secure by Letters Patent is, The employment of balls (*h h h*) attached to the rubber E of a washing machine, when said rubber has a reciprocatory movement in the tub, constructed and operating in the manner and for the purposes set forth.

In testimony whereof I have signed my name before two subscribing witnesses.

ZIBA CASTERLINE.

Witnesses:
H. HUSTED,
WELLINGTON DAWSON.